United States Patent [19]
Hegler et al.

[11] Patent Number: 5,472,659
[45] Date of Patent: Dec. 5, 1995

[54] METHOD FOR CONTINUOUSLY MANUFACTURING COMPOUND CORRUGATED PIPE HAVING SMOOTH PORTIONS

[75] Inventors: Ralph-Peter Hegler, Bad Kissingen; Wilhelm Hegler, Goethestrasse 2, D-97688 Bad Kissingen, both of Germany

[73] Assignee: Wilhelm Hegler, Germany

[21] Appl. No.: 154,855

[22] Filed: Nov. 19, 1993

[30] Foreign Application Priority Data

Dec. 1, 1992 [DE] Germany .......................... 42 40 268.9

[51] Int. Cl.⁶ .................................................. B29C 47/04
[52] U.S. Cl. ............................................ 264/508; 264/515
[58] Field of Search ...................................... 264/508, 506, 264/515; 425/133.1, 326.1; 156/244.14

[56] References Cited

U.S. PATENT DOCUMENTS 4,865,797 9/1989 Jarvenkyla ................................ 264/508

FOREIGN PATENT DOCUMENTS 0237900 3/1983 European Pat. Off. ..

OTHER PUBLICATIONS

European Search Report EP 93 11 7224, Jan. 6, 1994.

*Primary Examiner*—Christopher A. Fiorilla
*Attorney, Agent, or Firm*—Laff, Whitesel, Conte & Saret, Ltd.

[57] ABSTRACT

For the continuous manufacture of a compound pipe with a spigot which is substantially smooth on its outside, the compound pipe including a smooth internal tube and an external tube provided with transverse grooves and welded together with the internal tube, an external tube and an internal tube are extruded, the latter into the external tube. While the spigot which is substantially smooth on the outside is manufactured, its external wall is pressure-relieved by compensation chambers.

2 Claims, 4 Drawing Sheets

METHOD FOR CONTINUOUSLY MANUFACTURING COMPOUND CORRUGATED PIPE HAVING SMOOTH PORTIONS

BACKGROUND OF THE INVENTION

1. Field of the Invention

The invention relates to a method for the continuous manufacture of a compound pipe with a portion which is substantially smooth on its outside, the compound pipe consisting of a smooth internal pipe and of an external pipe provided with transverse grooves and welded together with the internal pipe, and an apparatus to put this method into practice.

A method of this type is known from EP 0 385 465 A2, in which the extrusion speed is reduced for manufacturing the portion which is smooth-walled on its outside, by means of which the wall thickness is supposed to be increased. This portion can form a spigot or a pipe socket after its corresponding widening.

As the manufacturing technique known from EP 0 385 465 A2 raises considerable problems, it has become known from DE 91 11 628 U1 to separately manufacture spigots and pipe sockets by injection-molding and to injection-mold or weld to the compound pipe.

From EP 0 271 598 A2 it is known to connect a pipe socket manufactured by injection-molding with the compound pipe in a plastic deformation process.

2. Summary of the Invention

It is an object of the invention to provide a method for the continuous manufacture of a compound pipe with a portion which is substantially smooth on its outside, the compound pipe consisting of a smooth internal pipe and of an external pipe provided with transverse grooves and welded together with the internal pipe, in which the internal tube and external tube are welded together all-over while correspondingly exerting pressure, without the pipe being damaged, and to provide an apparatus to put this method into practice.

The object underlying the invention is attained in case of a method comprising the following method steps: an external tube having an external wall is extruded, by a partial vacuum applied from its outside, the external tube is provided with a corrugation with the transverse grooves, an internal tube having an outer surface is extruded into the external tube, the internal tube is pressed against corrugation troughs of the external tube, where it is welded together with the external tube, at predetermined intervals the external tube is formed by a partial vacuum applied from its outside to form a substantially smooth-walled, about cylindrical portion, the internal tube is pressed from its inside with its full outer surface against the external tube and the external wall of the external tube in the vicinity of the approximately cylindrical portion is pressure-relieved in small surface sections. By the fact that the portion which is smooth-walled also on its outside is pressure-relieved in places, excess melt can escape at these places, so that excessive pressures are avoided when welding together the internal tube and the external tube, which may result in damages of this portion. The portions manufactured in this manner are subsequently widened to form pipe sockets or are used if necessary as spigots. For the purpose that on the one hand a pressure-relief takes place and on the other hand the pressures necessary for the welding process are maintained, the pressure-relieved places are relatively small.

The object is furthermore attained by the features wherein half shells, which are provided with annular mold recesses, and of which two at a time combine as a pair on a molding path to form a mold with a central longitudinal axis, are arranged on a machine bed to be guided in a circuit and in a direction of production, wherein the mold recesses are connected to partial vacuum channels formed in the half shells, wherein an injection head of an extruder is arranged upstream of the molding path, wherein the injection head is provided with an external nozzle for the extrusion of an external tube and, downstream in the direction of production, with an internal nozzle for the extrusion of an internal tube and, at its rear end seen in the direction of production, with a calibrating and temperature-regulating bell being provided with a calibrating cylinder, wherein at least one pair of half shells is provided with a spigot recess with a substantially cylindrical wall, and wherein compensation chambers are formed in the substantially cylindrical wall. By the fact that excess melt can escape into the compensation chambers, it is avoided that the profiling roller as well as the pipe are damaged by the calibrating and temperature-regulating bell.

Further advantageous features will become apparent from the sub-claims.

Further features, details and advantages of the invention will become apparent from the ensuing description of preferred exemplary embodiments taken in conjunction with the drawing.

DESCRIPTION OF THE PREFERRED EMBODIMENTS

Figure 1:
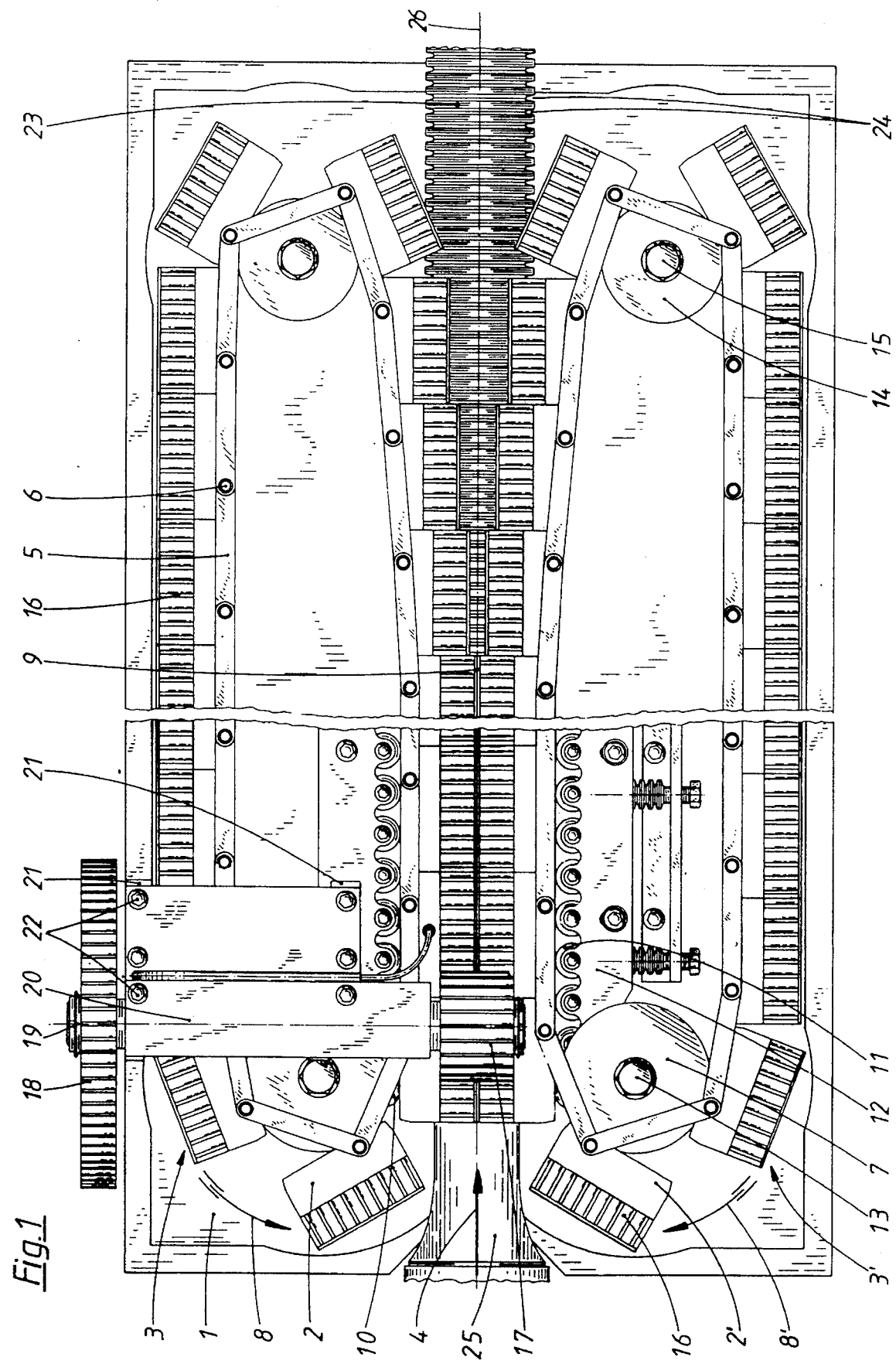
FIG. 1 is a plan view of an apparatus for the production of compound plastic pipes.

As seen in FIG. 1, the apparatus for the production of plastic compound pipes with transverse grooves comprises a machine bed 1, on which half shells 2, 2' are arranged, which are joined together respectively in two so-called chains 3, 3'. For this purpose, a fish-plate 5 is coupled by means of a coupling bolt 6 to each half shell 2, 2' in the outer region thereof and downstream thereof with respect to the direction 4 of production, each fish-plate 5 being attached to the succeeding half shell 2, 2' at the corresponding position, likewise by means of another coupling bolt 6. The chains 3, 3' thus formed, at their rear end with respect to the direction 4 of production, are guided around deflection wheels which serve as so-called feed rollers 7. The individual half shells 2, 2' are swung into a molding path 9 by the revolution of the chains 3, 3' in the direction of the arrows 8, 8'. In this path 9 two half shells 2, 2' at a time are united to a half shell pair, so that an unbroken succession of pairs of half shells mutually abut in the direction 4 of production. In order to achieve rapid closure of the half shells 2, 2' into a parallel and adjoining orientation, so-called closing rollers 10 are provided, which bring the rear ends of the half shells 2, 2', referred to the direction 4 of production, together in accelerated fashion.

In the molding path 9 itself, the mutually abutting half shells 2, 2' are pressed together by means of guide rollers 11, which are rotatably mounted in guide rails 12. The feed rollers 7 are mounted on the machine bed 1 rotatably around axle bearings 13. At the front end of the machine bed 1, seen in the direction 4 of production, return rollers 14, likewise serving as deflection wheels, are mounted rotatably around axle bearings 15, around which the chains 3, 3' are deflected and returned to the feed rollers 7. As can be seen in FIG. 1, the guide rails 12 with the guide rollers 11 terminate by the length of several half shells 2, 2' before the return rollers 14, so that the half shells 2, 2' can be displaced away from each other transversely of the direction 4 of the production while remaining parallel to each other, before they are guided around the return rollers 14.

On the upper side of the half shells 2, 2' there is provided a set of teeth 16, and the two sets of teeth 16 of the half shells 2, 2' which are arranged in abutting pairs match each other, so that a common drive pinion 17 can engage in the teeth 16 from above, and push the half shells 2, 2' along the molding path 9 as a closed mold. This drive pinion 17 is driven in conventional manner by a motor (not shown) through a drive gear wheel 18 which is fixedly mounted on a shaft 19, the shaft in turn carrying the drive pinion 17. The shaft 19 is housed in a bearing block 20, which is set apart from the machine bed 1 by means of spacing pieces 21 and firmly fixed in relation to the machine bed 1 by means of screws 22.

In the illustrated apparatus, plastic pipes 23, namely so-called compound pipes, having among other things transverse profile features, i.e. with grooves 24 extending around their girth, are produced.

The pipes 23 will be described in more detail in the following. For this purpose an extruder is provided, of which only the injection head 25 to be described in more detail in the following is shown. The apparatus thus far described is known, for example, from U.S. Pat. No. 4,492,551 and from U.S. Pat. No. 5,141,427.

Figure 2:
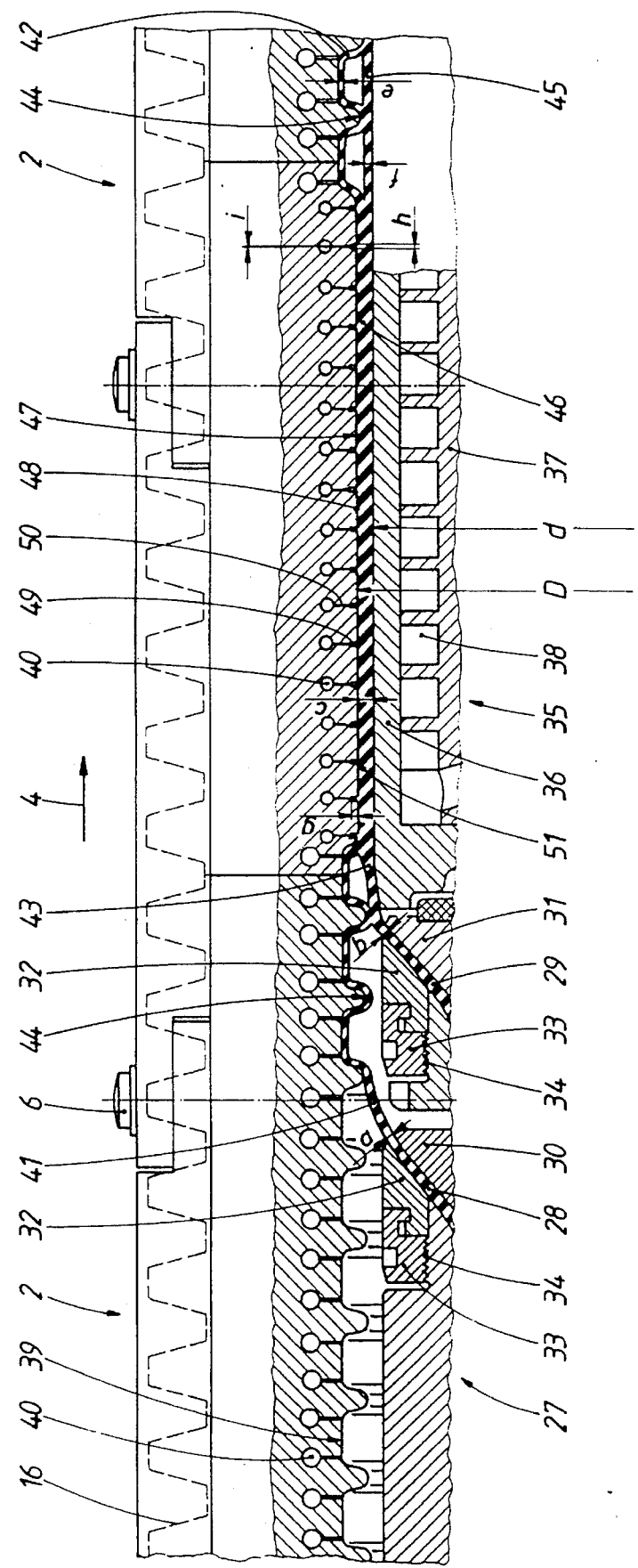
FIG. 2 is a vertical partial section through the apparatus with a recess for the manufacture of a spigot in a compound pipe.

As can be primarily seen from FIG. 2, a nozzle body 27 projecting into the mold path 9 is disposed on the injection head 25 concentrically to a common central longitudinal axis 26 of the injection head 25 and the mold path 9, in which nozzle body 27 an external channel 28 and an internal channel 29 are provided. The external channel 28 ends in an external nozzle 30, the internal channel 29 ends in an internal nozzle 31. The width a of the external nozzle 30 and the width b of the internal nozzle 31 can be regulated each time by the fact that a nozzle ring 32 defining the respective nozzle 30 or 31, respectively, on the external side is adjustable by means of a nozzle ring nut 33 in the direction of the axis 26 or the direction 4 of production, respectively. The nozzle ring nut 33 is adjustable each time on a corresponding thread 34 on the nozzle body 27.

A calibrating and temperature-regulating bell 35 follows the nozzle body 27 in the direction 4 of production. This bell 35 is provided with a substantially cylindrical calibrating cylinder 36, which is arranged likewise concentrically to the axis 26 and embodied in conventional manner, which calibrating cylinder 36 is arranged on a temperature-regulating cylinder 37. On the external side of the temperature-regulating cylinder 37, i.e. on the internal side of the calibrating cylinder 36, a temperature-regulating channel 38 is formed, through which a temperature-regulating medium, namely a cooling medium or a heating medium, can be guided.

As can be seen from FIG. 2, annular mold recesses 39 are formed in the half shells, of which only the half shells 2 are shown in FIG. 2, which mould recesses 39 are connected in known manner to partial vacuum channels 40.

The melt of plastic material supplied by the extruder through the injection head 25 flows in part through the external channel 28 to the external nozzle 30, from which an external tube 41 is extrusion-moulded which, due to the partial vacuum, moves into the mold recesses 39 thus forming a tube provided with the transverse grooves 24. Correspondingly cooled down and cured it forms the corrugated external pipe 42 of the pipe 23.

Another part of the melt flows through the internal channel 29 towards the internal nozzle 31, from which exits a further tube, namely an internal tube 43, which gets on the calibrating cylinder 36. From the internal nozzle 31 in the direction 4 of production, the calibrating cylinder 36 widens slightly outwards until the internal tube 43 comes to bear against the corrugations troughs 44 of the external tube 41, where it is welded together with them. Once cooled down and cured, the internal tube 43 forms the internal pipe 45 of the compound pipe 23.

As can be seen from FIG. 2, the half shells 2, 2' are structured such that so-called spigots 46 are formed in each case at predetermined intervals within the continuously produced compound pipe 23. To this end an essentially cylindrical spigot recess 47 having a substantially cylindrical wall 48 is formed in a pair of half shells 2, 2'. There is no requirement for a spigot 46 to extend naturally over the full length of a pair of half shells 2, 2' in the direction 4 of production; it may also extend merely over a part of this length. This means that the diameter D of the cylindrical wall 48 is larger by the double wall thickness c of the to-be-produced spigot 46 in comparison with the diameter d of the calibrating cylinder 36. In this case welding together of external tube 41 and internal tube 43 takes place only by pressing together the two tubes 41, 43 between the calibrating cylinder 36 and the wall 48 of the spigot recess 47. The speed of the mold may have been reduced in this case by an appropriate triggering of the drive motor for the drive pinion 17, so that more melt per unit of length of the to-be-produced pipe 23 arrives in the spigot 46 than for the production of the compound pipe 23 provided with grooves 24, so that the wall thickness c of the spigot 46 is larger than the sum of the wall thicknesses e and f of external pipe 42 and internal pipe 45. In order to prevent the melt from being pressed between the wall 48 and the calibrating cylinder 36 during the production of the spigot 46 due to an inaccurate metering by the extruder, compensation chambers 49 in the shape of small rings are formed in the cylindrical wall 48 of the corresponding half shell 2, 2', into which compensation chambers 49 open the vacuum slits 50, which are connected in each case with a partial vacuum channel 40. This means that the compensation chambers 49 on the one hand are open with the spigot mold space 51 serving to form a spigot 46 and on the other hand are connected to a partial vacuum channel 40. Excess melt, which is not needed for filling the spigot mold space 51, can escape into these compensation chambers 49, without hereby damaging the spigot 46. Damages of this kind may also occur by the fact that due to a too high pressure in the spigot mold space the friction between melt and calibrating cylinder 36 becomes too high. As the compensation chambers 49 are connected to the partial vacuum channels 40, excess melt can in fact enter the latter. The depth g of the compensation chambers 49 measured radially to the axis 25 from the direction of the wall 48 and their width h in the direction 4 of production depends essentially on the rheological properties of the melt, and that primarily on its visosity. Their dimensioning depends on that on the one hand the pressures necessary for welding together the internal tube 45 and the external tube 41 are produced, without the necessity of having to compensate for extreme overpressures by a possible surplus of melt in the spigot mold space 51. For the width h of the compensation chambers 49 in the direction 4 of production in comparison with the width i of the vacuum slits 50 likewise in the direction 4 of production it applies: h≦2i. The compensation chambers may also extend parallel to the axis 26, otherwise, however, they may be equally dimensioned and connected to the partial vacuum channels.

Figure 3:
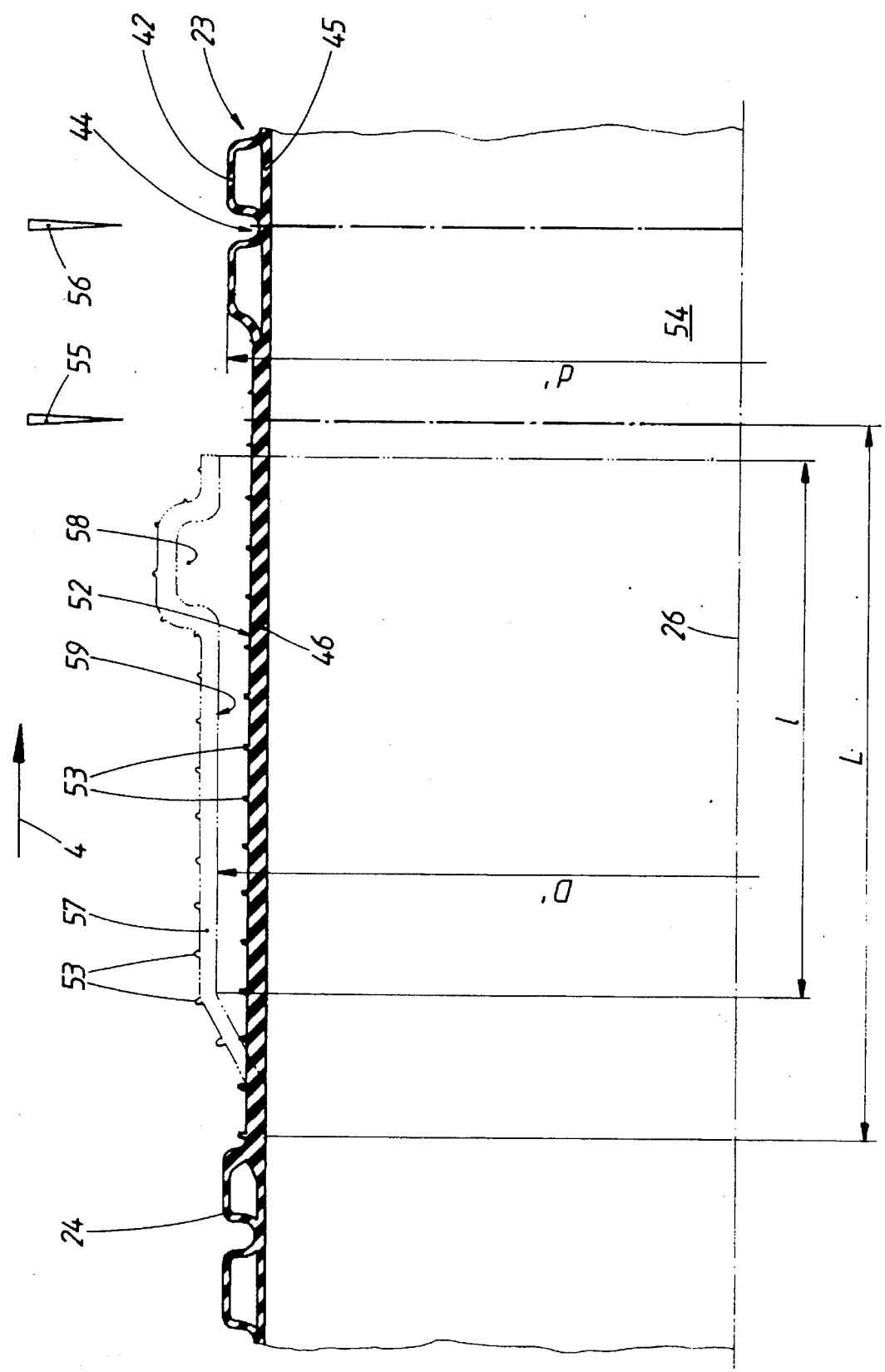
FIG. 3 is a compound pipe, in which a spigot is continuously manufactured.

As can be seen from FIG. 3, the compensation chambers 49 lead to the fact that on the external wall 52 of a spigot 46 small circumferentially extending web-like projections 53 are formed, of which the dimensions correspond at maximum to those of the compensation chambers 49. In this context it is to be noted that the width of the vacuum slits 50 is so small that the melt cannot enter the latter. As can be further seen from FIG. 3, the projections 53 become larger and wider opposite to the direction 4 of production. This is caused by the fact that not the entire excess melt is pressed from the start exclusively into the compensation chambers 49, but also gets choked partially opposite to the direction 4 of production, so that with the advancing formation of a spigot the relative surplus of melt increases with the result that more melt is pressed or escapes, respectively, into the compensation chambers 49.

Furthermore in FIG. 3 a portion of transition 54 is shown, which—referred to the direction 4 of production—is formed in the front, i.e. at the transition of the compound pipe 23 provided with grooves 24 to the spigot 46. This portion of transition 54 is separated by means of two saw cuts 55, 56. Consequently a short pipe portion formed by the portion of transition 54 is cut out.

In FIG. 3 a socket 57 is shown in dot-dash lines, which is formed by placing the spigot 46 after separation of the portion of transition 54. The socket 57, too, has the projections 53 on its external side. The socket 57 is provided with a strongly formed internal groove 58 for receiving a sealing ring. The internal diameter D' of the cylindrical internal wall 59 of the socket 57 is approximately equal to or unlikely larger than the external diameter d' of the pipe 23 with the grooves 24. As can be seen from FIG. 3, the axial length l of the socket 57 is lower than the axial length L' of the spigot 46 due to the placing of the spigot and in particular to the formation of the internal groove 58.

Figure 4:
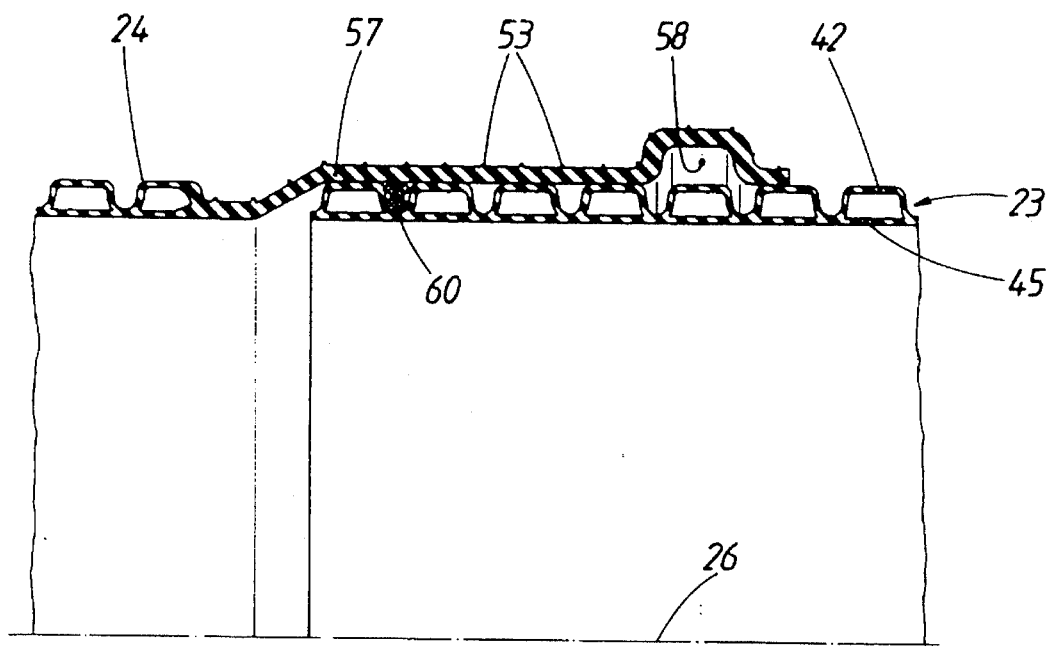
FIG. 4 is a pipe connection between a pipe with a socket and a corrugated compound pipe and FIG. 5 is a pipe connection between a compound pipe with a pipe socket and a smooth-walled solid pipe.
Figure 5:
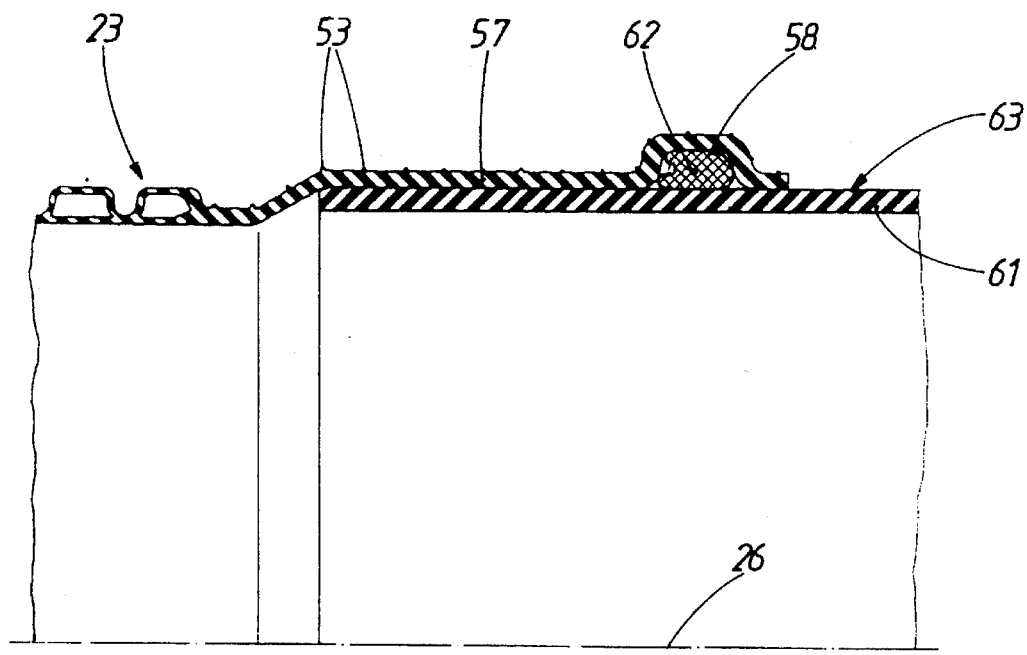

FIG. 4 shows an interconnection of two pipes 23, in which the molded socket 57 is manufactured in the type and manner described with regard to FIG. 3, i.e. the socket 57 being pushed over the pipe 23 provided with grooves 24 and consisting of the corrugated external pipe 42 and the smooth internal pipe 45. A seal 60 is placed into a groove 24. In contrast thereto FIG. 5 shows a compound pipe 23 with a socket 57 manufactured in the described manner, which is pushed onto a smooth-wailed solid pipe 61 or onto a pipe portion in the shape of a solid pipe. To this end a seal 62 is arranged in the internal groove 58, which abuts on the smooth cylindrical external wall 63 of the solid pipe 61 in a sealing manner.

What is claimed is:

1. A method for a continuous manufacture of a compound pipe (23) of plastic material with a corrugated portion having an outer diameter (d') and with a substantially cylindrical spigot (46) which has a substantially smooth outside and an outer diameter (D) which is smaller than said outer diameter (d') of said corrugated portion, the compound pipe (23) consisting of a smooth internal pipe (45) having a constant inner diameter (d), and an external pipe (42) provided with transverse grooves (24) in the corrugated portion and provided with said substantially smooth outside on said spigot (46) and welded together with the internal pipe (45), comprising the following method steps:

an external tube (41) of molten plastic material having an external wall (52) is extruded with an inaccurate metering of said molten plastic material;

by a partial vacuum applied from its outside, the external tube (41) is provided with a corrugation with the transverse grooves (24) to form an outer portion of said corrugated portion;

an internal tube (43) of molten plastic material having an outer surface is extruded with an inaccurate metering of said molten plastic material into the external tube (41);

the internal tube (43) is pressed against corrugation troughs (44) of the external tube (41), where it is welded together with the external tube (41) to form said corrugated portion;

at predetermined intervals the external tube (41) is formed by said partial vacuum into said outer portion of said spigot (46);

the internal tube (43) is pressed from its inside with its full outer surface against said substantially smooth-walled outer portion of the external tube (41); and the external wall (52) of said substantially smooth-walled outer portion of the external tube (41) is pressure-relieved in small surface sections to form small projections as compensation of said inaccurate metering of said molten plastic material of at least one of said external tube (41) and said internal tube (43).

2. A method according to claim 1, wherein the external wall (52) is pressure-relieved in annular-shaped zones.

* * * * *